(Model.)
O. W. TAFT.
BIRD CAGE.
No. 250,600. Patented Dec. 6, 1881.
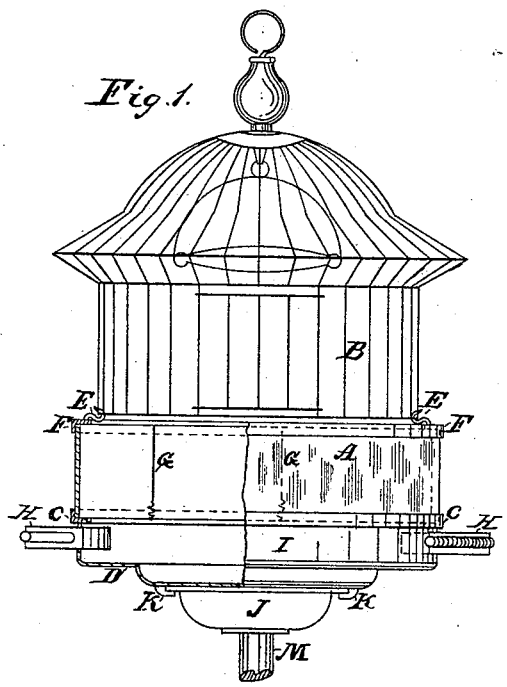
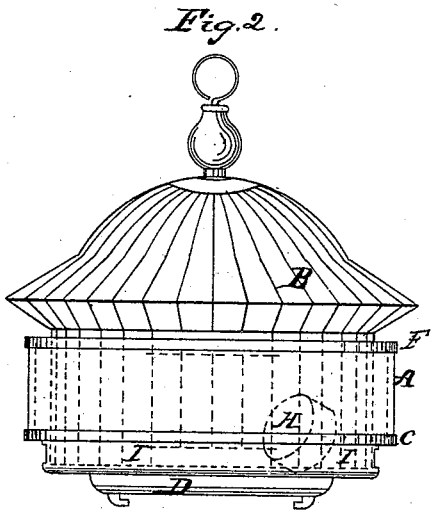
Witnesses:
O. H. Morgan
J. H. Morgan
Inventor
Owen W. Taft,
By A. P. Thayer,
Atty

UNITED STATES PATENT OFFICE.

OWEN W. TAFT, OF NEW YORK, N. Y.

BIRD-CAGE.

SPECIFICATION forming part of Letters Patent No. 250,600, dated December 6, 1881.

Application filed June 23, 1881. (Model.)

*To all whom it may concern:*

Be it known that I, OWEN W. TAFT, of New York, New York county, New York, have invented a new and useful Improvement in Bird-Cages, of which the following is a specification.

This invention relates, first, to the construction of a cage the body portion of which is composed partly of the ordinary wire-work and partly of glass, wire-gauze, or other suitable band, such as is employed as a guard to prevent the seed-shells and other matters from being thrown out and scattered upon the floor by the bird.

It relates, secondly, to the construction and arrangement of the bottom of the cage with respect to the employment of the aforesaid guard in connection with it; also, to the connection of the feed-cups and the bath-cup.

Guards have been used heretofore to prevent the seeds and other matters from being scattered through the wire-work upon the floor, being constructed of a perforated metal band, also of sections of perforate or imperforate material, with windows and openings for the feed-cups and soldered to the lower ring of the wire-work body of the cage. They have also been constructed of glass, also net-work of wire in the form of an outside guard surrounding the wires and the feed-cups.

I propose to make a band or guard of wire net-work, or of glass, either whole or in plates, or of isinglass, forming part of the cage-body, and detachably secured at the top to the lower ring of an upper part of the body, made of ordinary wire-work, for ready access to the interior for cleaning out the cage; also, for convenience in packing for shipment. I also propose in some cases to make the top larger or smaller than the guard, for telescoping when detached for further economy in packing. The glass may be colored, painted, ground, sand-blasted, or otherwise decorated.

I propose to make a bottom of stamped, spun, pressed, or cast material of any suitable kind, dispensing with the usual flange employed to catch the seeds and other matters thrust out by the bird, but making a vertical section thereto of suitable height above the bottom for the connection of the glass or other guard sufficiently above the bottom for inserting the feed-cups in openings of said section between the guard and bottom, also dispensing with the opening to the bath-tub sometimes made in the center of the bottom, but attaching the bath-tub all the same for a convenient place to keep it when not in use.

By inserting the feed-cups just above the bottom plate the bird is forced to the cage-bottom to feed, and thus the scattering of seeds upon the floor is more effectually prevented, and the openings for the feed-cups can be more conveniently and cheaply made in the material of the bottom than in the guard, whether of glass or net wire-work.

Figure 1 in the accompanying drawings is partly a side and partly a sectional elevation of a cage constructed according to my improvements, the cage being shown in that form of construction above referred to in which the guard is detachable from the wire-work and one part is insertible within the other for packing. Fig. 2 is a side elevation of the same as when shortened by the insertion of one of the parts within the other.

A represents a guard, of glass or other transparent material, or it may be of wire net-work, interposed between the upper wire-work portion, B, of the cage-body and the top flange, C, of the bottom I D, and in this case is made sufficiently larger in diameter than said wire-work for the latter to drop down into it, and is detachably connected by hooks E, that may be detached and turned around, or it may be so connected by any other suitable device for allowing the two parts to be so closed, the one within the other. The wire-work may be made larger to close over the glass, if preferred. If not made to telescope, there will still be economy in space for packing by detaching the two parts and placing the bottom portion inverted over the conical top of the wire portion. In this case the said transparent guard is secured between the flange F, to which the wire-work is connected, and the flange C of the bottom by the wire springs G; but any equivalent device may be employed.

I may, if desired, construct these guards with the openings for inserting the feed-cups H; but I prefer to arrange the cups in the vertical side section, I, of the bottom D, which I extend sufficiently upward between bottom D and flange C to provide space therefor, making it vertical or suitably inclined to favor such arrangements, and dispensing with the wide flange usually projecting from the bottom for catching the seed, which, besides being unsightly, would obstruct the connection of the cups in this locality.

J represents the bath-tub which I propose to attach to the under side of the bottom, which extends wholly across without any opening into said tub, same as it has been heretofore attached to the cage-bottom provided with such opening, my object being to employ that location for keeping the cup when not in use, instead of attaching it there for use and keeping it elsewhere, which is not so desirable as this arrangement, for as there is no other location about the cage where it may be so properly kept, it is liable to be misplaced, while here it forms an ornamental attachment, and is always at hand when wanted. It is detachably connected to the bottom of the cage by the lug K, one or more of which may turn on a pivot like a button. When the bath-tub is to be used it is detached from its resting-place and put inside of the cage, same as other tubs.

I claim—

1. A bird-cage whereof the body consists, essentially, of a lower glass or other guard portion and an upper wire-work or equivalent portion, which are detachably connected at the top of the former and bottom of the latter, and one being larger than the other for telescoping or closing one within the other when detached, substantially as described.

2. A bird-cage whereof the body consists of an upper wire portion, an intermediate guard portion, a vertical section of the bottom, and said bottom, the said guard and upper wire portions being detachably connected together, substantially as described.

3. In a bird-cage, the lower portion of the body of which consists of a glass or other guard, A, a metallic or other equivalent bottom, D, having a vertical or equivalent section, I, between said bottom and said guard part A, in which are the openings for inserting the feed-cups between the guard and the bottom, substantially as described.

4. In a bird-cage having a close continuous or unopen bottom, D, the bath-tub J, detachably connected to said bottom for keeping when not in use, substantially as described.

OWEN W. TAFT.

Witnesses:
W. J. MORGAN,
S. H. MORGAN.